Patented Sept. 14, 1954

2,689,230

UNITED STATES PATENT OFFICE 2,689,230

ACIDIZING WELLS

Paul H. Cardwell and Louis H. Eilers, Tulsa, Okla., assignors to The Dow Chemical Company, Midland, Mich., a corporation of Delaware No Drawing. Application February 18, 1952, Serial No. 272,267

14 Claims. (Cl. 252—8.55)

The invention relates to the treatment of wells in earth formations. It more particularly concerns an improved composition for and method of acidizing wells particularly those drilled into earth formations which are fractured or vuggy.

In drilling into earth formations which are fractured or vuggy for the purpose of obtaining oil or gas the difficulty arises that the fractures become more or less blocked by the drilling mud circulated in the well during drilling, if not already more or less clogged with materials of one kind or another indigenous to the formation, such as carbonate deposits. These fracture-clogging deposits seal the pores of the opposed faces of the productive formation defining the walls of the fractures or vuggs, thereby hindering the production of fluid from the well. Attempts to remove these flow obstructing deposits from fractures or vuggy earth formations by injections of hydrochloric acid solutions, as in conventional well acidizing operations, are not desirably effective. In the usual acidizing operation, the acid attacks and dissolves away the formation mainly at the place at which the acid enters, although more or less of the acid also permeates to a limited extent the innumerable interconnected pores or interstitial spaces and becomes spent therein. As a result, the acid is more or less ineffectively expended close to the well hole forming cavernous openings and does not deeply enter and clean out the pores of the formation in communication with the fractures.

It is an object of the present invention to provide an acidizing composition for and method of acidizing wells, particularly those in fractured or vuggy formations, which penetrates deeply into fractures and vuggs and therein effectively removes clogging deposits without becoming ineffectively expended close to the well hole. Other objects and advantages will become apparent as the description of the invention proceeds.

The invention is predicated upon the discovery that by including in the aqueous hydrochloric acid solution with which the well is acidized from 0.01 to 0.5 per cent by weight of certain water-soluble cellulose ethers the acid solution no longer attacks and merely dissolves the formation to form cavernous openings close to the point of injection but instead penetrates deeply into the fractures and therein effectively cleans the walls thereof, thereby facilitating the flow of oil or gas from the formation into the fractures communicating with the well hole.

The invention then consists of the improved acid composition and method of acidizing wells hereinafter fully described and particularly pointed out in the claims.

In carrying out the invention, the water-soluble cellulose ether is dispersed in the acid solution as by slowly adding the cellulose ether while vigorously agitating the solution. Suitable concentrations for the acid are from 2 to 25 per cent of HCl by weight, although preferred concentrations are 10 to 20 per cent of HCl. Examples of water-soluble cellulose ethers which produce these desirable effects in hydrochloric acid solution containing from 2 to 25 per cent of HCl are water-soluble alkyl cellulose ethers, the water-soluble carboxyalkyl cellulose ethers, and the hydroxy alkyl cellulose ethers. Examples of such ethers are: methyl cellulose, ethyl cellulose, carboxymethyl cellulose, carboxyethyl cellulose, hydroxyethyl cellulose, hydroxypropyl cellulose, methyl carboxymethyl cellulose, ethyl carboxymethyl cellulose, methylethyl cellulose, hydroxy propylmethyl cellulose. The addition of the cellulose ether to the acid brings about an increase in viscosity which is generally less than 100 centipoises. Preferred proportions of the cellulose ether in the acid solution are from 0.25 to 0.5 per cent by weight.

The effect produced by the cellulose ether-containing acid on being brought into contact with the walls of the fractures in earth formations may be characterized as an etching action on the surface of the walls defining the fractures in the earth formation. As already indicated, the action of the cellulose ether-containing acid solution is distinctly different from that of the conventional cellulose ether-free acid. The difference in the action can be understood from the following comparative laboratory experiments on artificially made limestone fractures loaded with drilling mud, the artificial fracture being made by cutting a limestone block in two and then bringing the two pieces close together face to face at the cut surfaces. In these experiments, rectangular blocks of limestone (99% $CaCO_3$) each 4" thick, 16" high and 2 feet long were used. Each block was sawed in two, the saw cut being perpendicular to the broad faces of the block. The cut followed a zigzag course from one end of the block to the other making a total length of cut of 42 inches. The two saw cut surfaces so made were spaced from each other vis-à-vis $\frac{1}{25}$ inch apart and cemented together with a pair of bands of plaster of Paris cement each $\frac{1}{2}$ inch wide extending the full length of the cut surfaces adjacent to the outer faces of the block. In this way a simulated crack 3 inches wide was left between the two pieces of the block extending the length of the cut and sealed along the sides. The volume of space in the simulated crack was about 70 to 80 milliliters. A passageway was drilled into each end of the so formed simulated crack a short distance into the block to provide access to the crack and a pipe nipple was sealed into each passage. In preparation for a test the simulated crack was filled with a synthetic drilling mud formed of water, red clay, and bentonite mixed in the following proportions: Water 1300 grams, red clay (55% montmorillonite, 25% vermiculite, balance undetermined) 200 grams, and bentonite 50 grams. This was run into the crack through one of the nipples from an elevated vessel. After filling the crack with drilling mud the acidizing solution to be tested was run into the crack from one end at the rate of 100 milliliters per minute for 5 minutes using 10 to 25 pounds per square inch pressure. The temperature of the acidizing solution and the limestone block was about 80° F. Acidizing solution, if any emerging from the opposite end of the crack was collected and its HCl content determined. After injecting the acid into the crack the two pieces of block were separated and the surfaces defining the crack were examined to determine the attack on the limestone, the removal action of the acid on the drilling mud, as well as the distance of travel of the acidizing solution into the crack. Five tests were run of the foregoing type using a freshly cut block of the same limestone for each test. The data obtained are set forth in the following table:

*Table*

| Test No. | Percent Cellulose Ether [1] | Strength of acid emerging from end of crack, if any, percent | Length of crack etched by acid, inches | Remarks |
|---|---|---|---|---|
| 1 | 0.0 | 0.0 | 12 | Acid spent rapidly causing deep pits in first 8 inches of surface of block in crack. |
| 2 | 0.02 | 0.5 | 32 | Moderate etching of surface of block in crack. Most of mud removed. |
| 3 | 0.1 | 9.3 | 42 | Complete etching of surface of block in crack. Mud all removed. |
| 4 | 0.25 | 11.1 | 42 | Almost all surface of block in crack etched and most of mud removed. |
| 5 | 0.5 | 12.2 | 42 | Partial etching of surface of block in crack. Substantial amount of mud by-passed by acid solution. |

[1] Hydroxy propyl cellulose 4,000 cps. in 2% aqueous solution.

From the tabulated data, it is manifest that the cellulose ether-free acid solution becomes spent rapidly on the limestone block in the crack close to the point of entering and the acid solution does not travel a significant distance along the crack before becoming completely expended without removing much drilling mud. In comparison by the addition of water-soluble cellulose ether to the acid solution, in accordance with the invention, the action of the acid is markedly altered especially when the amount used is greater than 0.02 per cent and less than 0.5 per cent of the weight of the acid solution. A substantial improvement over the conventional acid solution is obtained with the addition of as little as 0.01 per cent of cellulose ether.

If desired a corrosion inhibitor may be included in the acid solution to protect the metal parts of the well from attack by the acid. In addition, there may be included an emulsion breaking agent to prevent the possibility of the acid solution forming undesirable emulsions with oil in oil producing formations.

We claim:
1. In a method of acidizing an earth formation having fractures therein penetrated by the bore of a well the step which consists in injecting into the earth formation through the bore of the well an aqueous solution containing from 2 to 25 per cent of HCl and from 0.01 to 0.5 per cent of a water soluble cellulose ether.
2. In a method according to claim 1 in which the amount of cellulose ether is 0.25 to 0.5 per cent.
3. In a method according to claim 1 in which the cellulose ether is methyl cellulose.
4. In a method according to claim 1 in which the cellulose ether is hydroxy propylmethyl cellulose.
5. In a method according to claim 1 in which the cellulose ether is carboxy methyl cellulose.
6. In a method according to claim 1 in which the cellulose ether is hydroxy propyl cellulose.
7. In a method according to claim 1 in which the cellulose ether is methyl carboxymethyl cellulose.
8. A composition for acidizing wells comprising an aqueous solution having dissolved therein from 2 to 25 per cent of HCl and from 0.01 to 0.5 per cent of a water soluble cellulose ether.
9. A composition according to claim 8 in which the amount of cellulose ether is 0.25 to 0.5.
10. A composition according to claim 8 in which the cellulose ether is methyl cellulose.
11. A composition according to claim 8 in which the cellulose ether is hydroxypropyl cellulose.
12. A composition according to claim 8 in which the cellulose ether is carboxy methyl cellulose.
13. A composition according to claim 8 in which the cellulose ether is hydroxy propyl methyl cellulose.
14. A composition according to claim 8 in which the cellulose ether is methyl carboxy methyl cellulose.

References Cited in the file of this patent
UNITED STATES PATENTS

| Number | Name | Date |
|---|---|---|
| 2,596,137 | Fast | May 13, 1952 |